US008340237B2

(12) United States Patent
Sahara

(10) Patent No.: US 8,340,237 B2
(45) Date of Patent: *Dec. 25, 2012

(54) WIRELESS COMMUNICATION METHOD, WIRELESS COMMUNICATION SYSTEM, BASE STATION AND MOBILE STATION

(75) Inventor: Toru Sahara, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 234 days.

This patent is subject to a terminal disclaimer.

(21) Appl. No.: 12/934,583

(22) PCT Filed: Mar. 26, 2009

(86) PCT No.: PCT/JP2009/056182
§ 371 (c)(1),
(2), (4) Date: Sep. 24, 2010

(87) PCT Pub. No.: WO2009/119768
PCT Pub. Date: Oct. 1, 2009

(65) Prior Publication Data
US 2011/0026633 A1  Feb. 3, 2011

(30) Foreign Application Priority Data
Mar. 26, 2008 (JP) .............................. P. 2008-081381

(51) Int. Cl.
*H04L 7/00* (2006.01)
(52) U.S. Cl. .................. 375/355; 370/355; 455/502
(58) Field of Classification Search .................. 375/260, 375/295, 320, 324, 340, 355; 370/208, 280, 370/328, 505; 455/502
See application file for complete search history.

(56) References Cited

U.S. PATENT DOCUMENTS

| | | | | |
|---|---|---|---|---|
| 6,967,936 B1 * | 11/2005 | Laroia et al. | ................. | 370/329 |
| 7,633,924 B2 * | 12/2009 | Fujii et al. | ..................... | 370/343 |
| 7,751,448 B2 * | 7/2010 | Laroia et al. | ................. | 370/505 |
| 7,881,345 B2 * | 2/2011 | Laroia et al. | ................. | 370/505 |

(Continued)

FOREIGN PATENT DOCUMENTS

JP  9-266466  10/1997

(Continued)

OTHER PUBLICATIONS

International Search Report and Written Opinion issued in PCT/JP2009/056182, on Apr. 28, 2009, 8 pages.

(Continued)

*Primary Examiner* — David Ometz
*Assistant Examiner* — Bahman Badipour
(74) *Attorney, Agent, or Firm* — Procopio, Cory, Hargreaves & Savitch LLP

(57) ABSTRACT

There is provided a wireless communication method, a wireless communication system, a base station and a mobile station which conduct wireless communication using an OFDM modulation scheme. The base station transmits a timing correction burst to the mobile station only when a correlation peak detected from a received OFDM symbol is within a predetermined timing detection range. If the timing correction burst is not introduced from the base station even after expiration of predetermined time duration, by copying a signal by a length different from a guard interval from the end of an effective symbol and adding the copied signal to the front of the effective symbol, the mobile station generates a new timing correction channel (second time), in which transmission timing of a previously generated timing correction channel is shifted.

8 Claims, 12 Drawing Sheets

U.S. PATENT DOCUMENTS

| | | | |
|---|---|---|---|
| 7,961,811 B2 * | 6/2011 | Miyoshi et al. | 375/295 |
| 8,134,938 B2 * | 3/2012 | Yi et al. | 370/255 |
| 8,184,662 B2 * | 5/2012 | Umehara et al. | 370/474 |
| 2004/0052319 A1 * | 3/2004 | Wakamatsu | 375/343 |
| 2004/0228270 A1 * | 11/2004 | Chen et al. | 370/210 |
| 2005/0147186 A1 * | 7/2005 | Funamoto et al. | 375/324 |
| 2006/0274777 A1 * | 12/2006 | Fujii et al. | 370/445 |
| 2007/0133695 A1 * | 6/2007 | Kotzin | 375/260 |
| 2007/0133701 A1 * | 6/2007 | Iwami | 375/260 |
| 2007/0159957 A1 * | 7/2007 | Ljung et al. | 370/208 |
| 2007/0171810 A1 * | 7/2007 | Suda et al. | 370/208 |
| 2008/0084845 A1 * | 4/2008 | Kuchibhotla et al. | 370/331 |
| 2008/0293398 A1 * | 11/2008 | Seyama et al. | 455/422.1 |
| 2009/0046604 A1 * | 2/2009 | Matsumoto et al. | 370/280 |
| 2009/0122771 A1 * | 5/2009 | Cai | 370/338 |
| 2009/0296645 A1 * | 12/2009 | Bui | 370/329 |
| 2009/0316634 A1 * | 12/2009 | Sahara | 370/329 |
| 2009/0323836 A1 * | 12/2009 | Nakano et al. | 375/260 |
| 2010/0097962 A1 | 4/2010 | Sahara et al. | |
| 2011/0038249 A1 * | 2/2011 | Tamaki et al. | 370/210 |
| 2011/0142148 A1 * | 6/2011 | Nakamura | 375/260 |
| 2011/0150144 A1 * | 6/2011 | Sohn | 375/340 |
| 2011/0176472 A1 * | 7/2011 | Amini et al. | 370/312 |

FOREIGN PATENT DOCUMENTS

| | | |
|---|---|---|
| JP | 11-113049 | 4/1999 |
| JP | 2000-68972 | 3/2000 |
| JP | 2000-134176 | 5/2000 |
| JP | 2000-252947 | 9/2000 |
| JP | 2000-315991 | 11/2000 |
| JP | 2001-119368 | 4/2001 |
| JP | 2001-257641 | 9/2001 |
| JP | 2003-069546 | 3/2003 |
| JP | 2006-310986 | 11/2006 |
| JP | 2009-10661 | 1/2009 |
| JP | 2009-10662 | 1/2009 |
| JP | 2009-41547 | 4/2009 |
| WO | 2006-075586 | 7/2006 |
| WO | 2008-038543 | 4/2008 |

OTHER PUBLICATIONS

International Search Report and Written Opinion issued in PCT/JP2009/051283, on Apr. 28, 2009, 5 pages.

* cited by examiner

US 8,340,237 B2

WIRELESS COMMUNICATION METHOD, WIRELESS COMMUNICATION SYSTEM, BASE STATION AND MOBILE STATION

TECHNICAL FIELD

The present invention relates to a wireless communication method, a wireless communication system, a base station, and a mobile station, which conduct wireless communication using an OFDM (Orthogonal Frequency Division Multiplexing) modulation scheme.

BACKGROUND ART

In recent years, as a mobile station represented by a mobile phone system, a PHS (Personal Handy phone System), and a PDA (Personal Digital Assistant) have been provided. These mobile stations are capable of conducting communication such as making and receiving a call and transmitting and receiving data by accessing base stations installed with a predetermined distance from one another through a communication network accessed by the base stations.

One of schemes used for such a wireless communication system to transmit a digital signal is an OFDM modulation scheme. Since an OFDM modulation scheme transmits transmission data by distributing them to a plurality of carriers, in which orthogonal frequencies are set, a band of each of the carriers becomes narrow, so that frequency use efficiency is very high.

In addition, as shown in FIG. 10, the OFDM modulation scheme is composed of an effective symbol corresponding to a signal period, during which IFFT (Inverse Fast Fourier Transformation) is performed at the time of transmission, and a guard interval 50 obtained by copying the waveform of a part of the latter half of the effective symbol as it is. For example, if the effective symbol length is 512 samples, the guard interval 50 is 64 samples, which is ⅛ of the effective symbol length. And, the guard interval 50 is inserted into a former half of an OFDM symbol. In the OFDM modulation scheme, the insertion of the guard interval 50 permits intersymbol interference due to multipath, and thereby enhancing the resistance against multipath.

However, in a so-called 'next generation PHS' wireless communication system, communication is possible by performing transmitting and receiving a notification channel (BCCH: Broadcast Control Channel) between the base stations (CS: Cell Station) and the mobile stations (PS: Personal Station) arranged within a service zone and assigning a communication channel (TCH: Traffic Channel), at the time of an outgoing call, an incoming call, location registration, and others.

In order to establish such a communication channel, it is necessary to correct transmission timing of a mobile station to be synchronized with reference timing of a base station. To generally explain the flow, firstly, the mobile station generates a channel for timing correction and transmits an OFDM symbol to the base station. The base station performs timing detection by using the received OFDM symbol and notifies the mobile station of a differential from reference timing of the base station. The mobile station corrects transmission timing to solve the differential from the reference timing.

The mobile station sends a communication channel assignment request for making an outgoing call to the base station at the corrected transmission timing. Upon receiving this request, the base station transmits communication channel assignment information to the mobile station (for example, Patent Literatures 1 to 4).

Patent Literature 1: JP-A-2000-68972
Patent Literature 2: JP-A-2000-134176
Patent Literature 3: JP-A-2000-315991
Patent Literature 4: JP-A-2001-119368

DISCLOSURE OF THE INVENTION

Technical Problem to be Solved by the Invention

In the base station, a guard interval is removed from the OFDM symbol to obtain an effective symbol, and then FFT (Fast Fourier Transformation) is preformed. When detecting timing, IFFT is additionally performed to detect a correlation peak with a known ideal symbol, which has already been synchronized with the reference timing of the base station. And, the differential from the reference timing of the base station at the time of the detection of the correlation peak is transmitted to the mobile station by means of a timing correction burst (FIG. 11)

However, there is a case where if timing detection is performed after removal of a guard interval, a correlation peak at timings 60 of both sides of the effective symbol length, to which IFFT is applied, increases (FIG. 12). In that case, the correlation peak is incorrectly detected, so that a correction amount of transmission timing in the mobile station becomes wrong.

As a precautionary measure, it may be considered to perform timing detection prior to removal of a guard interval. However, in the state that different communication channels are mixed, correlation values of timing detection are reduced, so that it also causes incorrect detection.

In addition, for example, in the case of delaying timing, there is a risk that sub-carriers conducting communication are interfered by other sub-channels or forward and backward time slots.

In consideration of this problem, the object of the present invention is to provide a wireless communication method, a wireless communication system, a base station, and a mobile station, which are capable of more successfully performing timing detection in a base station, in wireless communication using an OFDM modulation scheme, to more completely avoid impossibility of access between the mobile station and the base station.

Means for Solving the Problems

In order to solve the above-described problems, the representative configuration of the present invention relates to a wireless communication method of conducting wireless communication between a mobile station and a base station by using an OFDM modulation scheme, the method comprising: notifying a notification channel (Broadcast Control Channel; BCCH) from the base station to the mobile station; in the mobile station, generating a channel to be frame synchronized with the notification channel and transmitting an OFDM symbol to the base station; in the base station, as peak detection processes thereof, removing a guard interval from the transmitted OFDM symbol to obtain an effective symbol; detecting a correlation peak between the effective symbol and a known ideal symbol; and only when the correlation peak is detected in a predetermined timing detection range shorter than a length of the effective symbol, transmitting a differential from reference timing of the base station at the time of the detection of the correlation peak to the mobile station by means of a timing correction burst; in the mobile station, if the timing correction burst is not introduced from the base station even after expiration of predetermined time duration from the transmission of the OFDM symbol to the base station, copying a signal by a length different from a guard interval from the end of an effective symbol and adding the copied signal to the front of the effective symbol to shift transmission timing of a previously generated channel by a predetermined shift amount so as to generate a new channel having the shifted transmission timing; and transmitting an OFDM symbol to the base station to implement the peak detection processes of the base station again, and if the timing correction burst is introduced from the base station within the predetermined time, correcting transmission timing by calculating a sum of shift amounts of transmission timing to the present time in order to solve a differential from reference timing of the base station; and transmitting a communication channel assignment request to the base station at the corrected transmission timing.

There has been a case where if timing detection is performed after a guard interval is removed, a correlation peak at both sides of an effective symbol length to which IFFT is applied increases. In this case, since an incorrect correlation peak is detected, timing detection has been failed. Thus, a base station has prepared a predetermined timing detection range and has not transmitted a timing correction burst if a correlation peak is presented at circumferential sides, namely, both sides of an effective symbol length.

In the mobile station, if a timing correction burst is not received even after expiration of predetermined time duration from transmission of an initially generated channel, a new channel, in which transmission timing is shifted, is generated to retransmit an OFDM symbol. Specifically, a signal is copied by a length different from a guard interval from the end of an effective symbol and the copied signal is added to the front of the effective symbol, thereby transmitting a symbol with phase shifted. As a result, in the base station, if a correlation peak is detected within a predetermined timing detection range, the timing correction burst is returned to the mobile station. Accordingly, transmission timing of the mobile station is corrected, and a communication channel is established, so that possibility of wireless communication access increases.

In addition, since timing is shifted by copying a signal, the problem that sub-carriers conducting communication are interfered by other sub-channels or forward and backward time slots is solved.

In the process of generating a new channel in the mobile station described above, any of two types of channels that are alternatively generated due to differentials by a predetermined shift amount in transmission timing may be generated.

In other words, channels having two types of transmission timings may be alternatively generated. This is to expect that transmission timing of the mobile station is returned back to that previously shifted, and during repeated retransmission, timing detection is successfully accomplished. For example, in the event that the mobile station could not have received a timing correction burst from the base station since the mobile station has accidentally come into a so-called dead point, in which wireless communication cannot be established, the mobile station can receive the timing correction burst if it comes out of the dead point.

In the process of generating a new channel in the mobile station described above, by making a length of signal to be copied shorter or longer than a guard interval, a channel, in which transmission timing is advanced or delayed by a predetermined shift amount, may be generated.

In other words, transmission timing may be continuously shifted in one direction by advancing or delaying timing. This is to expect that during repeated performance of such a process, timing detection is successfully accomplished.

It is preferable to make a sum of the shift amounts described above shorter than an effective symbol length. If the sum is longer than an effective symbol length, timing detection is failed. To this end, an amount of one shift is required to be shorter than an effective symbol length. If two types of transmission timings are alternatively generated, a sum of shift amounts always meets the above requirement. In addition, if transmission timing is continuously shifted in one direction, it is preferable to control the number of times of shifting to meet the requirement.

If a communication channel is not assigned from the base station despite that the mobile station has transmitted the communication channel assignment request to the base station as described above, it is preferable to transmit an OFDM symbol to the base station at the same timing as a previously generated channel to implement peak detection processes of the base station again.

As to the cause of the event that a communication channel is not assigned from the base station despite that the timing correction burst has been obtained, transmission timing has been corrected by using the burst, and the communication channel assignment request has been transmitted to the base station, it may be assumed that the mobile station has come into a dead point, or communication power is low. In this case, it is prudent to perform the transmission again at transmission timing of a previously generated channel, namely, the transmission timing when the timing correction burst is obtained. In the event that the mobile station has come into a dead point or other similar situations, if such a channel is generated to transmit an OFDM signal, it is highly likely that a timing correction burst can be immediately obtained without performing the process of shifting transmission timing.

In order to solve the above-described problems, another representative configuration of the present invention relates to a wireless communication system comprising a mobile station and a base station, which conduct wireless communication by using an OFDM modulation scheme, wherein the base station comprises: a notification unit that notifies the mobile station of a notification channel; a guard interval removing unit that removes a guard interval from an OFDM symbol transmitted from the mobile station through a channel generated by the personal channel to obtain an effective symbol; a timing detection unit that detects a correlation peak between the effective symbol and a known ideal symbol; and a correlation peak determination unit that transmits a differential from reference timing of the base station at the time of the detection of the correlation peak to the mobile station by means of a timing correction burst only when the correlation peak is detected within a predetermined timing detection range shorter than a length of the effective symbol; and wherein the mobile station comprises: a timing correction channel generating unit, which generates a channel to be frame synchronized with the notification channel and transmits an OFDM symbol to the base station, and which, if the timing correction burst is not introduced from the base station even after expiration of predetermined time duration from the transmission, copies a signal by a length different from a guard interval from the end of an effective symbol and adds the copied signal to the front of the effective symbol to shift transmission timing of a previously generated channel by a predetermined shift amount so as to generate a new channel having the shifted transmission timing and transmit an OFDM symbol to the base station; a shift storing unit that stores a sum of shift amounts of transmission timing in the timing correction channel generating unit; a transmission timing correcting unit which, if the timing correction burst is introduced from the base station within the predetermined time, corrects transmission timing by calculating a sum of shift amounts of transmission timing stored in the shift storing unit in order to solve a differential from reference timing of the base station; and a communication channel assignment request unit that transmits a communication channel assignment request to the base station at the corrected transmission timing.

In order to solve the above-described problems, still another representative configuration of the present invention relates to a base station that conducts wireless communication with a mobile station by using an OFDM modulation scheme, wherein the mobile station comprises: a timing correction channel generating unit, which generates a channel to be frame synchronized with a notification channel notified from the base station and transmits an OFDM symbol to the base station, and which, if a timing correction burst is not introduced from the base station even after expiration of predetermined time duration from the transmission, copies a signal by a length different from a guard interval from the end of an effective symbol and adds the copied signal to the front of the effective symbol to shift transmission timing of a previously generated channel by a predetermined shift amount so as to generate a new channel having the shifted transmission timing and transmit an OFDM symbol to the base station; a shift storing unit that stores a sum of shift amounts of transmission timing in the timing correction channel generating unit; a transmission timing correcting unit which, if the timing correction burst is introduced from the base station within the predetermined time, corrects transmission timing by calculating a sum of shift amounts of transmission timing stored in the shift storing unit to solve a differential from reference timing of the base station; and a communication channel assignment request unit that transmits a communication channel assignment request to the base station at the corrected transmission timing, and wherein the mobile station comprises: a notification unit that notifies the mobile station of a notification channel; a guard interval removing unit that removes a guard interval from an OFDM symbol transmitted from the mobile station through a channel generated by the personal channel to obtain an effective symbol; a timing detection unit that detects a correlation peak between the effective symbol and a known ideal symbol; and a correlation peak determination unit that transmits a differential from reference timing of the base station at the time of the detection of the correlation peak to the mobile station by means of a timing correction burst only when the correlation peak is detected within a predetermined timing detection range shorter than a length of the effective symbol.

In order to solve the above-described problems, still another representative configuration of the present invention relates to a mobile station that conducts wireless communication with a base station by using an OFDM modulation scheme, the mobile station comprising: a timing correction channel generating unit, which generates a channel to be frame synchronized with a notification channel notified from the base station and transmits an OFDM symbol to the base station, and which, if a timing correction burst is not introduced from the base station even after expiration of predetermined time duration from the transmission, copies a signal by a length different from a guard interval from the end of an effective symbol and adds the copied signal to the front of the effective symbol to shift transmission timing of a previously generated channel by a predetermined shift amount so as to generate a new channel having the shifted transmission timing and transmit an OFDM symbol to the base station; a shift storing unit that stores a sum of shift amounts of transmission timing in the timing correction channel generating unit; a transmission timing correcting unit which, if the timing correction burst is introduced from the base station within the predetermined time, corrects transmission timing by calculating a sum of shift amounts of transmission timing stored in the shift storing unit in order to solve a differential from reference timing of the base station; and a communication channel assignment request unit that transmits a communication channel assignment request to the base station at the corrected transmission timing.

The components or the descriptions thereof, which correspond to the technical concept of the wireless communication method described above, are applicable to the corresponding wireless communication system, base station, and mobile station.

Effects of the Invention

According to the present invention, in wireless communication using an OFDM modulation scheme, timing detection in the base station is more successfully accomplished, so that impossibility of access between the mobile station and the base station can be more completely avoided. In addition, since timing is shifted by copying a signal, the problem that sub-carriers conducting communication are interfered by other sub-channels or forward and backward time slots is solved.

DESCRIPTION OF REFERENCE NUMERALS

Figure 1:
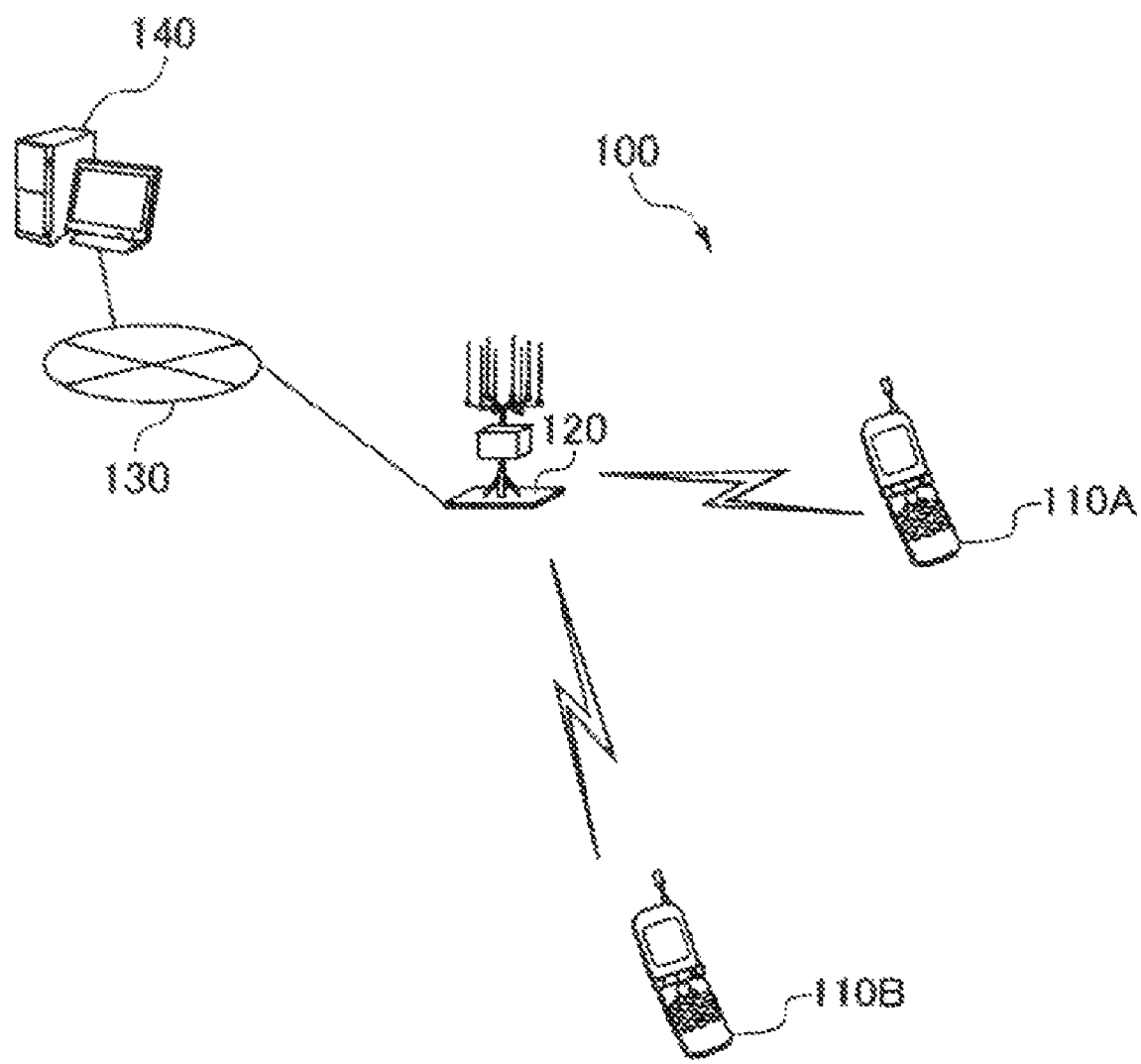
FIG. 1 A system block diagram for explaining a wireless communication system according to an embodiment of the present invention.

50 . . . guard interval, 100 . . . wireless communication system, 110A, 110B . . . mobile station, 120 . . . base station, 140 . . . management server, 200 . . . terminal control unit, 202 . . . terminal memory, 214 . . . timing correction channel generating unit, 216 . . . transmission timing correction unit, 218 . . . communication channel assignment request unit, 220 . . . OFDM modulation/demodulation unit, 314 . . . notification unit, 315 . . . symbol synchronization unit, 316 . . . guard interval removing unit, 317 . . . FFT unit, 318 . . . timing detection unit, 319 . . . correlation peak determination unit, 320 . . . OFDM modulation/demodulation unit, 322 . . . demodulation•decoding unit, 324 . . . modulation•encoding unit, 326 . . . IFFT unit, 328 . . . guard interval insertion unit

BEST MODE FOR CARRYING OUT THE INVENTION

Hereinafter, a preferable embodiment of the present invention will be described in detail with reference to the accompanying drawings. In such an embodiment, dimensions, materials, and other particular numerical values, etc., are merely exemplary to facilitate understanding of the invention and should not be construed as limiting the present invention thereto unless otherwise expressly described herein. Incidentally, in this specification and the drawings, components having substantially the same functions and configurations are denoted by the same reference numeral to omit repeated explanation, and components having no direct relation with the present invention are not illustrated.

When starting communication, a mobile station attempts to correct transmission timing to be synchronized with reference timing of a base station. A mobile station includes various electronic devices such as mobile phones, and PDAs. However, in this embodiment, a mobile station for use in a next generation PHS communication system is described.

FIG. 1 is a system block diagram for explaining a wireless communication system 100 according to this embodiment. The wireless communication system 100 includes a mobile station 110 (110A, 110B), a base station 120, a communication network 130, and a management server 140. Wireless communication using an OFDM modulation scheme is conducted between the mobile station 110 and the base station 120.

In the wireless communication system 100, when a user attempts to make a call to the other mobile station 110B by using the mobile station 110A, namely, when the mobile station 110A makes an outgoing call and when the mobile station 110B receives an incoming call, wireless communication with the base station 120, which lies in wireless communication coverage, is established according to the operation of the user's mobile station 110A, and the base station 120 requests communication access to the mobile station 110B to the management server 140 through the communication network 130.

However, it is necessary to correct transmission timing of the mobile station to be synchronized with reference timing of the base station 120 prior to establishment of wireless communication between the mobile station 110A and the base station 120.

Figure 2:
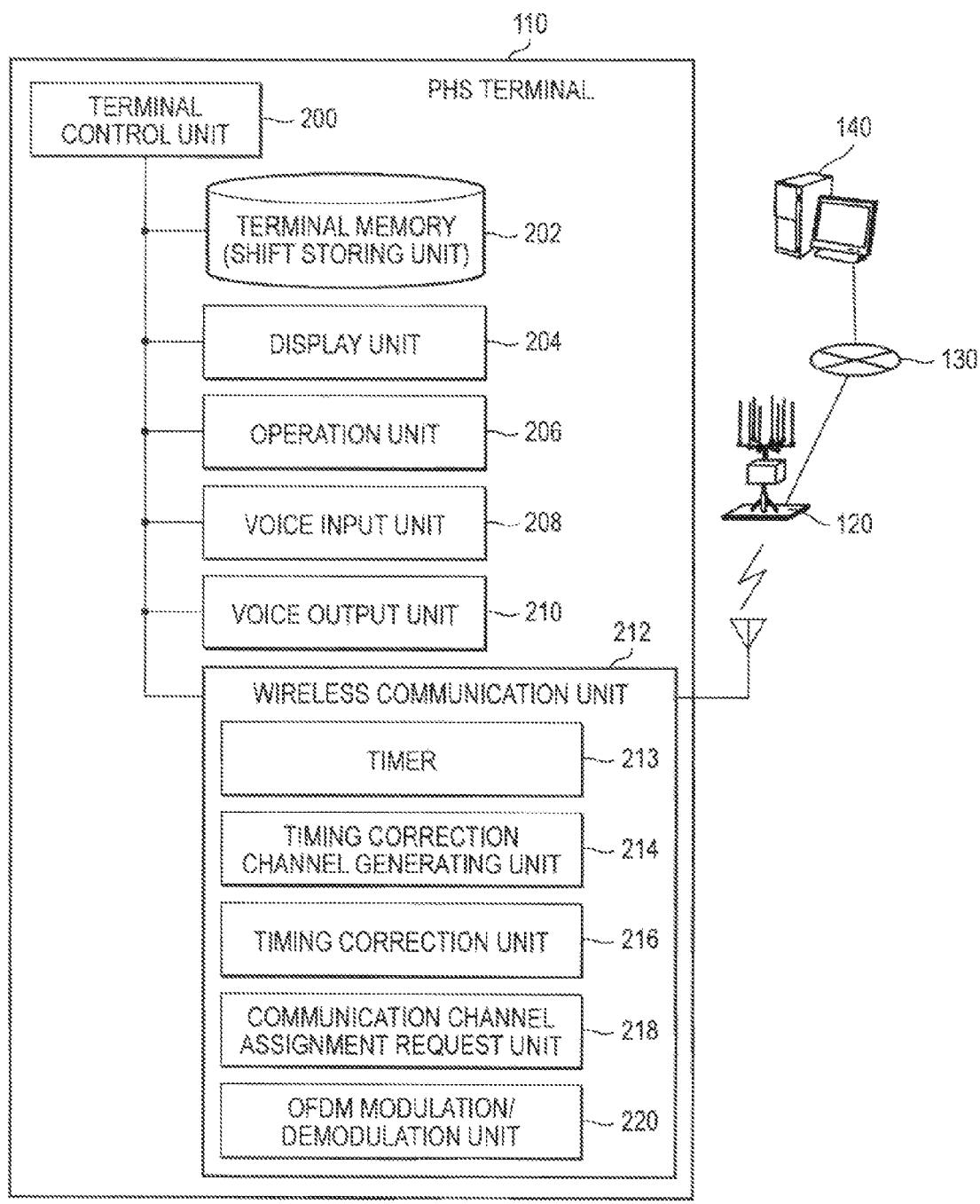
FIG. 2 A view showing detailed configuration of a base station of FIG. 1.
Figure 3:
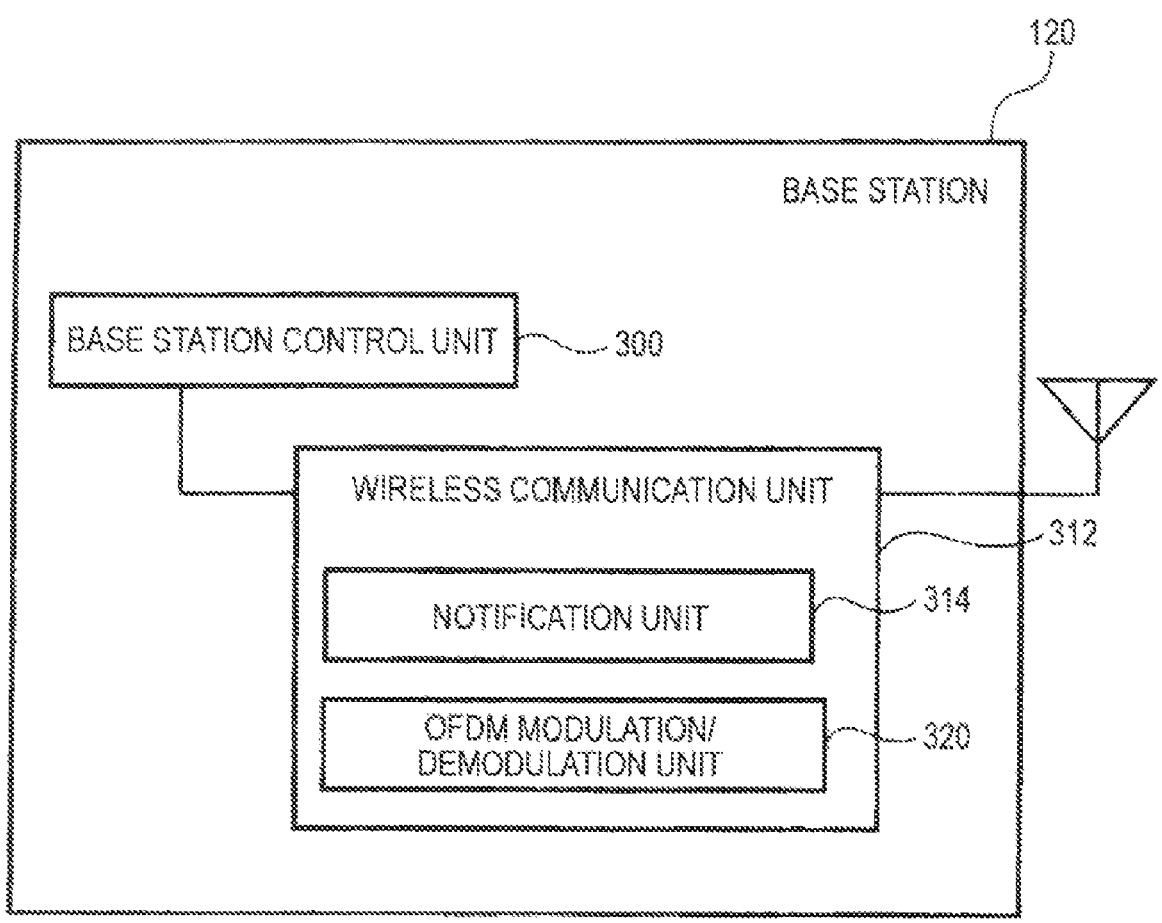
FIG. 3 A view showing detailed configuration of the base station of FIG. 1.

FIGS. 2 and 3 are views of detailed configurations of a mobile station and a base station of FIG. 1, respectively. As shown in FIG. 2, the mobile station 110 includes a terminal control unit 200 for controlling the terminal as a whole, a terminal memory 202, a display unit 204, an operation unit 206, a voice input unit 208, a voice output unit 210, and a wireless communication unit 212.

The terminal control unit 200 manages and controls the mobile station 110 as a whole by means of a semiconductor integrated circuit including a central processing unit (CPU). The terminal control unit 200 also performs call function using the mobile station 110 or mail transferring function, by using a program of the terminal memory 202.

The terminal memory 202 is configured by ROM, RAM, EEPROM, non-volatile RAM, flash memory, HDD, and so on. The terminal memory 202 stores programs processed in the terminal controller 200, and voice data, etc.

The display unit 204 is configured by a liquid crystal display, EL (Electro Luminescence), PDP (Plasma Display Panel), and so on. The display unit 204 can display Web Browser or GUI (Graphical User Interface) of application, stored in the terminal memory 202 or provided from an application relay server (not illustrated) through the communication network 130.

The operation unit 206 is configured by switches such as a keyboard, a cross key, and a joystick. The operation unit 206 accepts user's operation input.

The voice input unit 208 is configured by voice recognition means such as a microphone. The voice input unit 208 converts user's voice input during call into an electric signal, which can be processed in the mobile station 110.

The voice output unit 210 is configured by a speaker. The voice output unit 210 converts call counterpart's voice signal received in the mobile station 110 into voice and outputs the voice. In addition, the voice output unit 210 can output ringtones, operation sound of the operation unit 206, and alarm sound, etc.

The wireless communication unit 212 conducts wireless communication with the base station 120 in a next generation PHS communication system. As a wireless communication scheme, this embodiment employs an OFDM scheme, which is one of multiplexing schemes that effectively uses a frequency band by using a plurality of carriers on a unit time axis and making phases of signal waves to be modulated orthogonal between adjacent carriers to partially overlap bands of the carriers. Hereinafter, the components of the wireless communication unit 212 of the mobile station 110 will be described.

(Mobile Station)

The timing correction channel generating unit 214 generates a channel to be frame synchronized with a notification channel notified from the base station 120, which will be described in detail later, and transmits an OFDM symbol to the base station 120. In addition, the timing correction channel generating unit 214 measures the time after the transmission by means of a timer 213. If a timing correction burst is not introduced from the base station 120 even after expiration of predetermined time duration, the timing correction channel generating unit 214 generates a new channel having transmission timing, in which transmission timing of a previously generated channel is shifted by a predetermined shift amount, and transmits an OFDM symbol to the base station 120. More specifically, shifting transmission timing is performed by copying a signal by a length different from a guard interval from the end of an effective symbol and adding the copied signal to the front of the effective symbol.

The terminal memory 202 stores an shift amount when the timing correction channel generating unit 214 shifts the transmission timing once, and in which forward or backward direction the transmission timing is shifted. In addition, the terminal memory 202 functions as a shift storing unit, which stores a sum of amounts of transmission timing shifting performed by the timing correction channel generating unit 214.

If the timing correction burst is introduced from the base station 120 within a predetermined time period after the transmission of the channel, the transmission timing correction unit 216 corrects transmission timing by calculating a sum of the shift amounts of transmission timing stored in the terminal memory 202 to solve a differential from reference timing of the base station 120.

The communication channel assignment request unit 218 transmits a communication channel assignment request to the base station 120 at the corrected transmission timing.

After a communication channel is established, the OFDM modulation/demodulation unit 220 performs modulation/demodulation. The OFDM modulation/demodulation unit 220 removes a guard interval from the received OFDM symbol to apply FFT, extracts an effective symbol to demodulate it, encodes a signal to be transmitted, and applies IFFT to obtain an effective symbol. Furthermore, the OFDM modulation/demodulation unit 220 inserts a guard interval to generate an OFDM symbol, which will be transmitted from the wireless communication unit 212.

(Base Station)

As shown in FIG. 3, the base station 120 includes: a base station control unit 300 for controlling the base station 120 as a whole; and a wireless communication unit 312. The wireless communication unit 312 includes: a notification unit 314 for notifying the mobile station 110 of a notification channel; and an OFDM modulation/demodulation unit 320.

Figure 4:
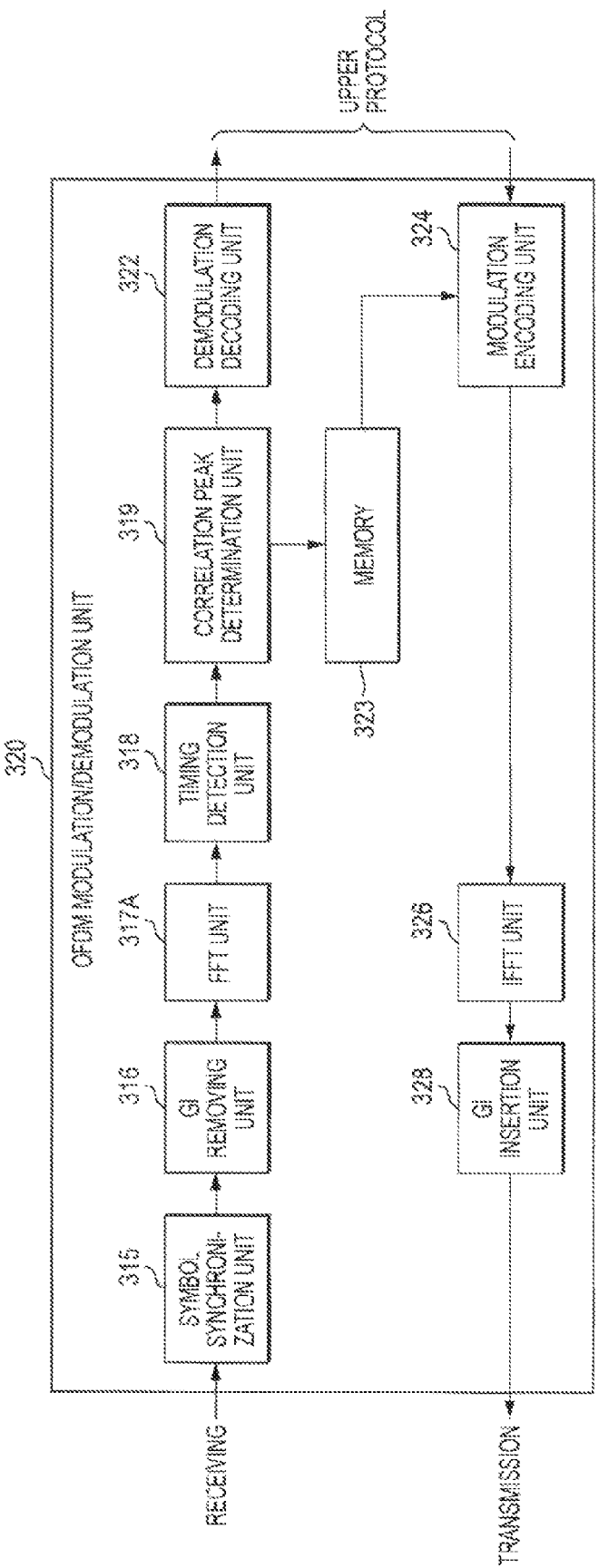
FIG. 4 A block diagram showing details of an OFDM modulation/demodulation unit of FIG. 3.

FIG. 4 is a block diagram showing details of the OFDM modulation/demodulation unit of FIG. 3. Hereinafter, the components of the OFDM modulation/demodulation unit 320 will be described.

Figure 10:
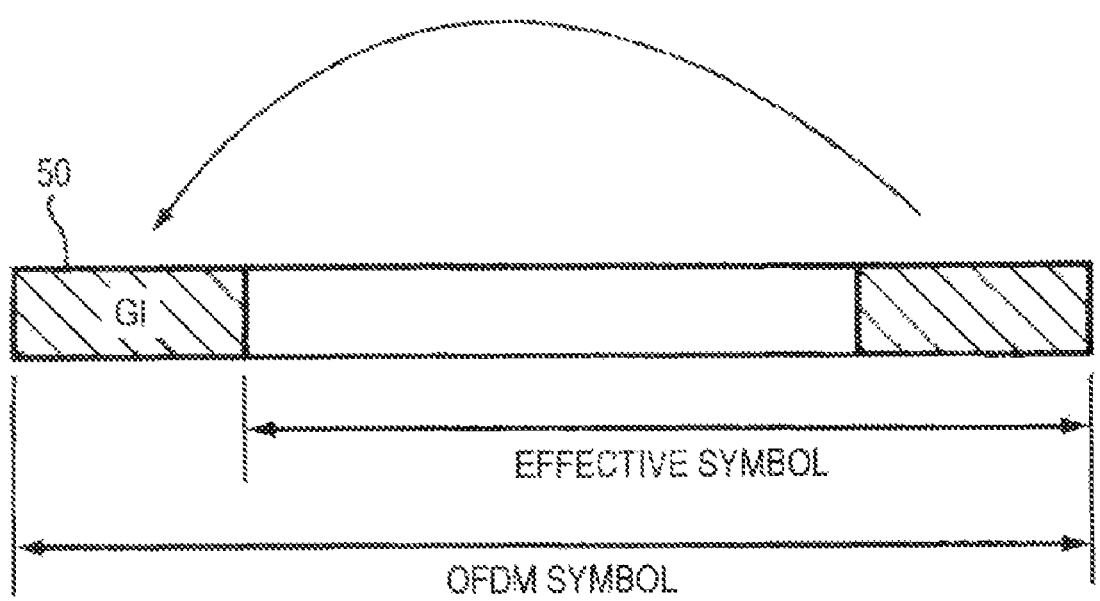
FIG. 10 A view showing configuration of an OFDM symbol used in an OFDM modulation scheme.

The symbol synchronization unit 315 takes symbol synchronization with an OFDM symbol transmitted from the mobile station 110 through a channel generated by the mobile station 110. The guard interval removing unit 316 removes a guard interval from the OFDM symbol to obtain an effective symbol (refer to FIG. 10). The FFT unit 317 applies FFT to the effective symbol.

Figure 11:
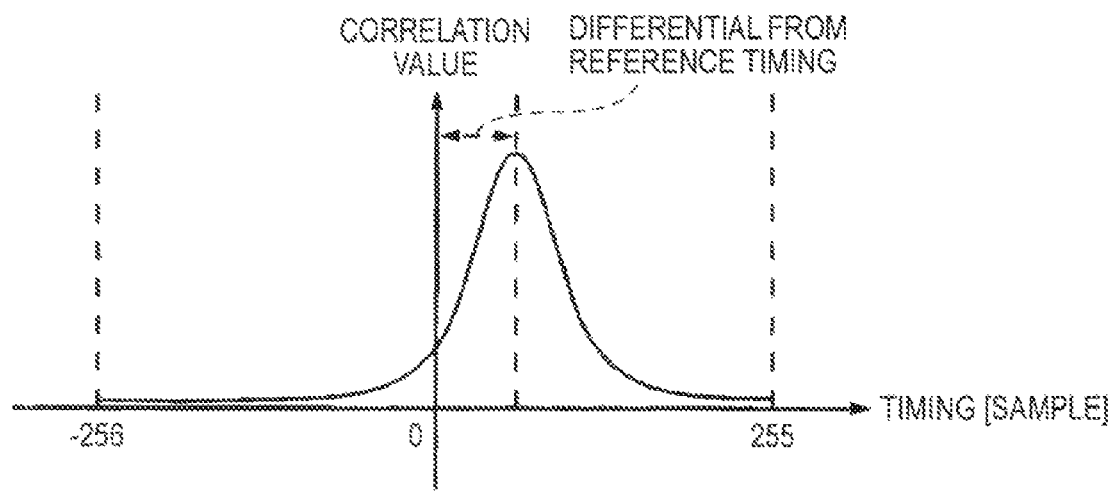
FIG. 11 A view showing the case where a correlation peak is detected within a timing detection range by the timing detection unit of FIG. 4.
Figure 12:
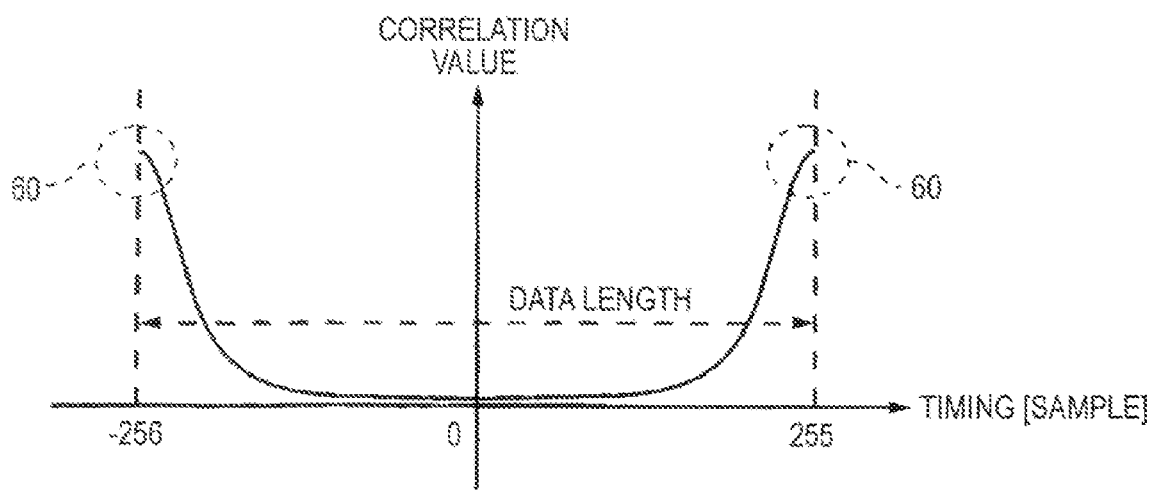
FIG. 12 A view showing the case where a correlation peak is detected beyond a timing detection range by the timing detection unit of FIG. 4.

The timing detection unit 318 detects a correlation peak between the effective symbol and a known ideal symbol. The correlation peak determination unit 319 transmits a differential (refer to FIG. 11) from reference timing of the base station 120 at the time of the detection of the correlation peak to the mobile station 110 by means of a timing correction burst only when the correlation peak detected in the timing detection unit 318 is in a predetermined timing detection range (FIG. 5) shorter than the effective symbol length. Specifically, a differential from reference timing of the base station 120 is recorded in the memory 323 and transferred to the modulation•encoding unit 324 so as to generate a timing correction burst.

Figure 5:
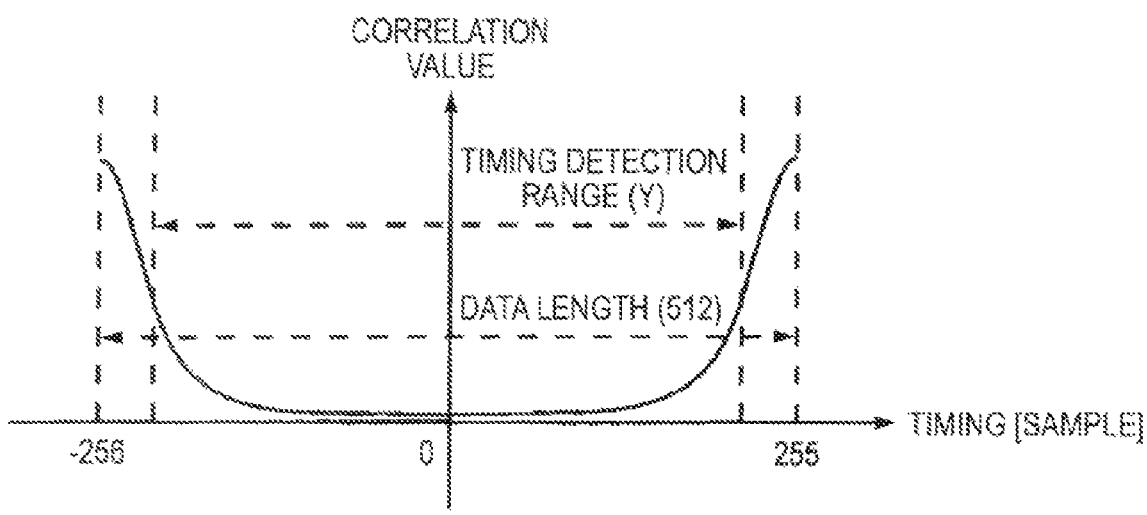
FIG. 5 A view showing a timing detection range set by a timing detection unit of FIG. 4.

Incidentally, the timing detection range is a range shifted from both ends of the effective symbol toward the inward direction, as shown in FIG. 5.

The effective symbol that has undergone this process is demodulated in the demodulation•decoding unit 322. Meanwhile, a signal to be transmitted is modulated •encoded in the modulation and encoding unit 324. The IFFT unit 326 applies IFFT to the encoded signal to obtain an effective symbol. Thereafter, the guard interval insertion unit 328 inserts a guard interval into the effective symbol to obtain an OFDM symbol and transmit the same.

(Correction of Transmission Timing)

Figure 6:
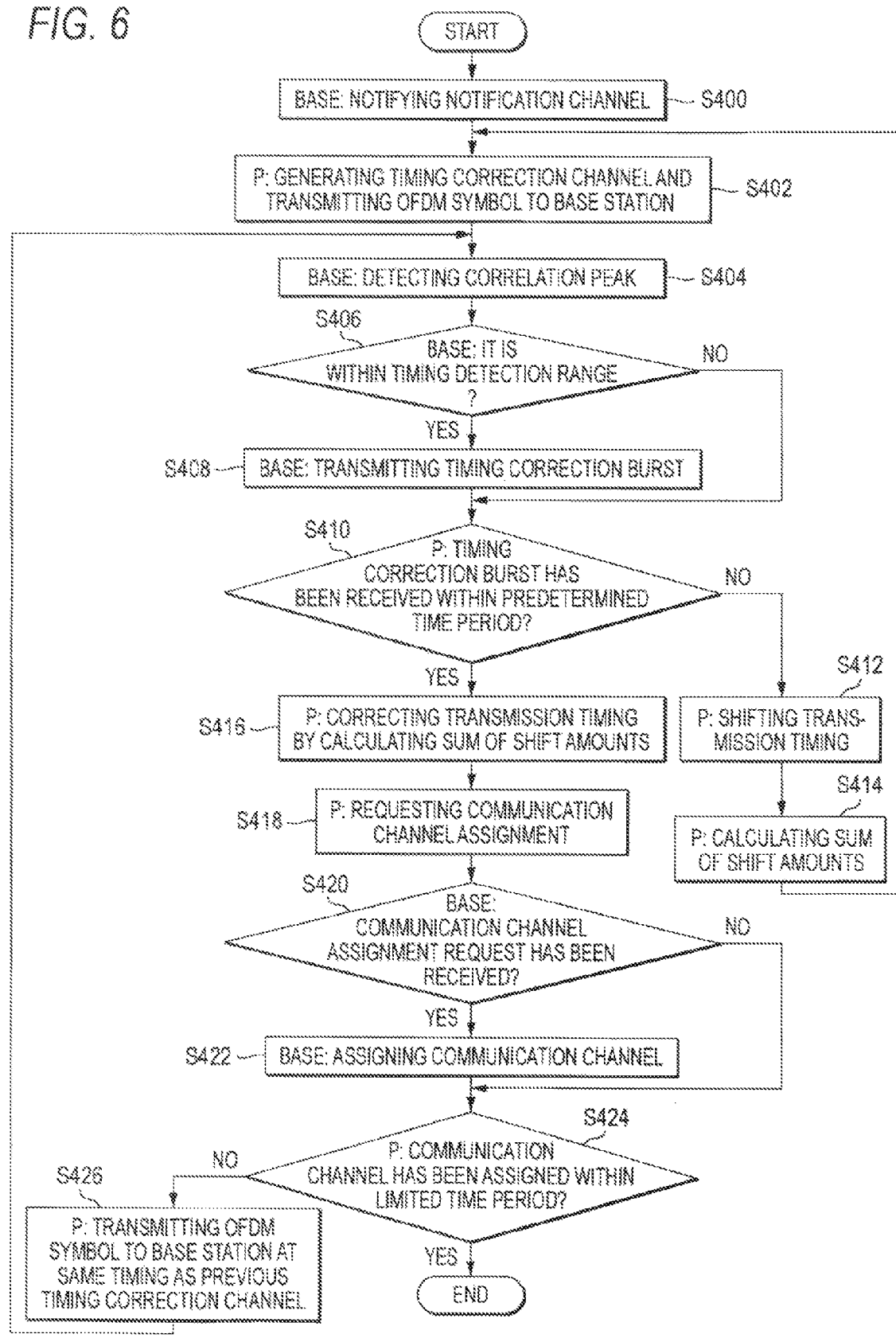
FIG. 6 A flow chart for explaining correction performance of transmission timing of a mobile station of FIG. 2.

FIG. 6 is a flow chart for explaining correction operation of transmission timing of the mobile station 110. In FIG. 6, "P:" relates to processes of the mobile station 110, and "Base:" relates to processes of the base station.

Firstly, a notification channel is notified from the base station 120 to the mobile station 110 (S400). Then, the mobile station 110 generates a channel to be frame synchronized with the notification channel and transmits an OFDM symbol to the base station 120 (S402).

With regard to peak detection processes of the base station 120, a guard interval is removed from the transmitted OFDM symbol by using the guard interval removing unit 316 to obtain an effective symbol. After the FFT unit 317 applies an FFT process, a correlation peak between the effective symbol and a known ideal symbol is detected by using the timing detection unit 318 (S404).

The correlation peak determination unit 319 of the base station 120 determines whether the correlation peak is detected within a predetermined timing detection range (FIG. 5) shorter than the effective symbol length (S406). In addition, only when the correction peak is detected within the terming detection range, a differential (FIG. 11) from reference timing of the base station 120 at the time of the detection of the correlation peak is transmitted to the mobile station 110 by means of a timing correction burst (S408).

On the other hand, if the correlation peak is detected beyond the timing detection range, namely, a correlation peak is detected at both sides of the effective symbol length (512 samples) as shown in FIG. 5, the correlation peak determination unit 319 does not transmit a timing correction burst.

In the mobile station 110, the time after the transmission of the OFDM symbol to the base station 120 is measured in the timer 213. And, whether or not the timing correction burst has been received within a predetermined time period is determined (S410). If the timing correction burst is not introduced from the base station 120 even after expiration of predetermined time duration, transmission timing of a previously generated channel is shifted by a predetermined shift amount (S412).

Figure 7:
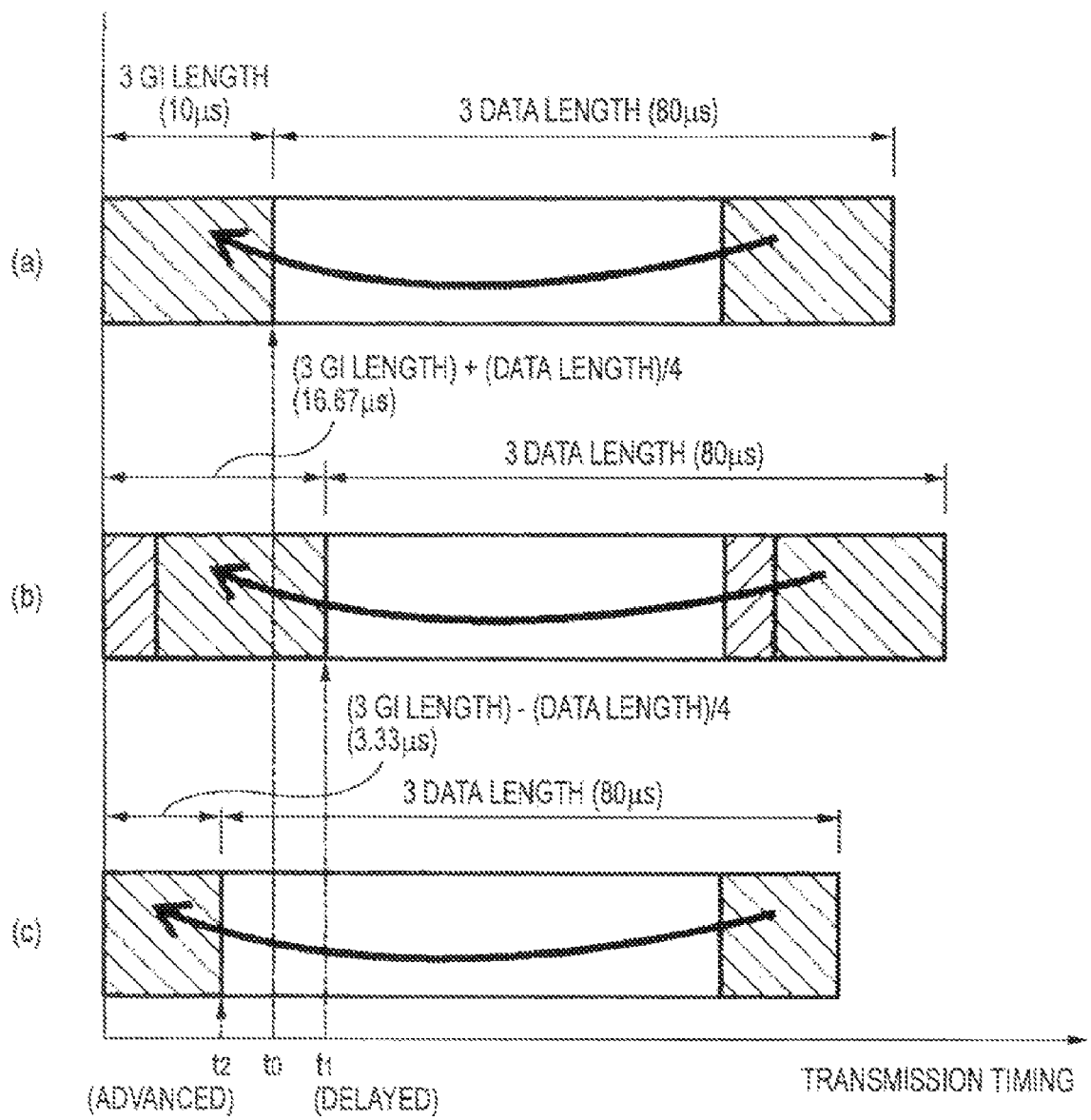
FIG. 7 A view describing specifically a method for shifting a transmission timing of FIG. 6.

FIG. 7 is a view describing specifically a method for shifting a transmission timing of FIG. 6. FIG. 7($a$) shows a signal prior to shifting timing. In the OFDM modulation scheme, a signal is copied by a predetermined length from the end of an effective symbol (data) length, and the copied signal is added to the front of data as a guard interval. As shown in FIG. 7($a$), as a guard interval is added each time 3 data are gathered, a length of the guard interval also was indicated to be 3 fold (designated as "3 GI length"). As shown in FIG. 7($a$), a transmission timing of a pre-shift signal is t0, the timing of the front of data.

FIG. 7($b$) shows the delayed signal by timing shift. In this case, a signal is copied by a length longer than a guard interval (3 GI length) from the end of data, and the copied signal is add to the front of data. In this embodiment, a signal as long as (data length)/4=6.67 μs is copied from the end of data, and it is added to the front. Thus, the transmission timing $t_1$ can be delayed by 6.67 μs from $t_0$, the pre-shift timing.

FIG. 7($c$) shows the advanced signal by timing shift. In this case, a signal is copied by a length shorter than a guard interval (3 GI length) from the end of data, and the copied signal is add to the front of data to obtain the transmission timing $t_2$. In this embodiment, the advanced time is also (data length)/4=6.67 μs.

Thus, in embodiments of the present invention, using the continuity of signals modulated by OFDM, timing is shifted by a cyclic method in which a signal is copied by a length different from a guard interval length from the end of data, and the copied signal is added to the front.

Incidentally, the above-described advanced time/delayed time (6.67 μs) which represents a shift amount only illustrates the present invention. Further, in said embodiments, although a guard interval is added each time 3 data are gathered, the present invention is not limited to these embodiments, and also it is possible to add a guard interval each time a predetermined data are gathered.

The above shift amount is added to the known summed shift amount recorded in the terminal memory 202 to produce a new sum of shift amounts (S414). As a result, a new channel having the shifted transmission timing is generated to transmit an OFDM symbol again to the base station 120 (S402) and implement peak detection processes of the base station 120 again.

On the other hand, in the mobile station 110, if the timing correction burst is introduced from the base station 120 within a predetermined time period, a sum of the shift amounts of transmission timing to the present, which are stored in the terminal memory, is calculated to correct transmission timing to solve a differential from reference timing of the base station 120 (S416). And, a communication channel assignment request is transmitted to the base station 120 at the corrected transmission timing (S418).

Figure 13:
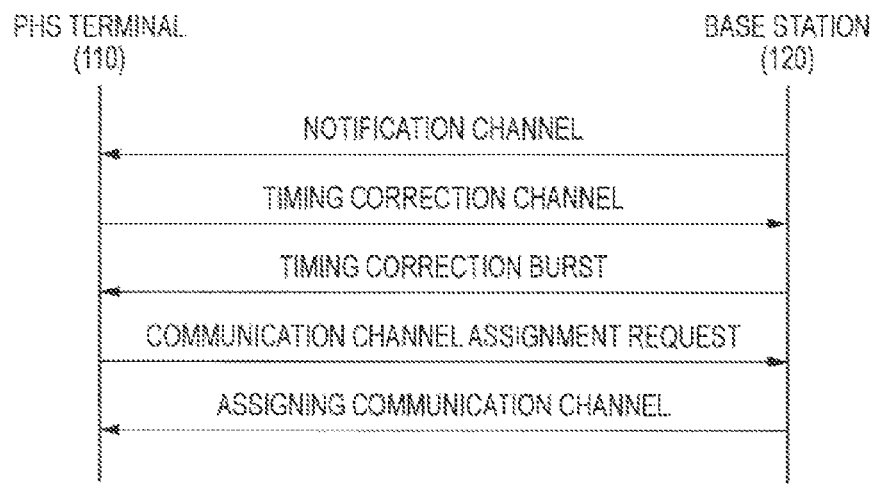
FIG. 13 A sequential view showing a case, in which communication channel assignment is successfully accomplished in a related art.
Figure 14:
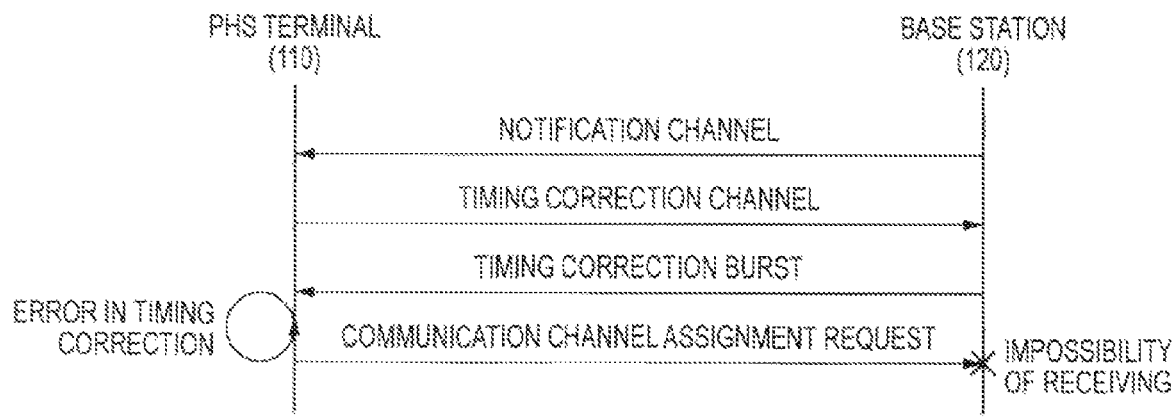
FIG. 14 A sequential view showing a case, in which the communication channel assignment is failed in the related art.

In related art as well, if timing detection is performed after a guard interval is removed, and a correlation peak within an effective symbol length to which IFFT is applied increases, timing detection is successfully accomplished, and communication channel assignment is performed (FIG. 13). However, there is a case where a correlation peak at both sides of the effective symbol length increases. In this case, since an incorrect correlation peak is detected, an error occurs in timing correction. As a result, a communication channel assignment request has not been received in the base station, and communication channel assignment has been failed (FIG. 14).

Figure 8:
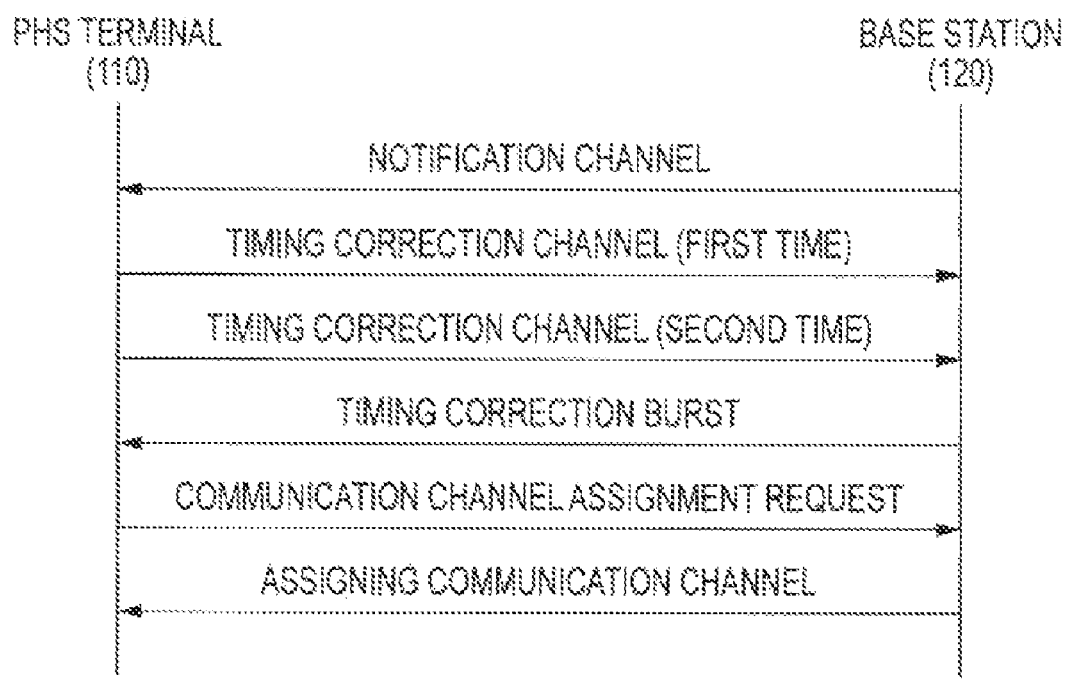
FIG. 8 A sequential view showing that assignment of a communication channel is successfully accomplished by generating a second timing correction channel in FIG. 6.

Thus, in this embodiment, according to the flow chart of FIG. 6, the base station 120 prepares a predetermined timing detection range as shown in FIG. 5, and if a correlation peak is presented at circumferential sides, namely, both sides of an effective symbol length, the base station 120 does not transmit a timing correction burst. As shown in FIG. 8, the timing correction burst was not given for a firstly generated timing correction channel.

As shown in FIG. 8, in the mobile station 110 of this embodiment, if the timing correction burst could not been received even after expiration of predetermined time duration from transmission of a firstly generated channel, a new (second) channel, in which transmission timing is shifted, is generated to retransmit an OFDM symbol (S412, S414, and S402 of FIG. 6). As a result of the second transmission, in the base station 120, if a correlation peak is detected within a predetermined timing detection range, the timing correction burst is returned to the mobile station 110. As a result, transmission timing of the mobile station 110 is corrected, and a communication channel is established, so that possibility of wireless communication access increases.

In the process of generating a new channel (S412) in the mobile station 110 of FIG. 8, any of two types of channels, which are alternatively generated due to differentials by a predetermined shift amount in transmission timing, may be generated. In other words, in S412, channels having two types of transmission timings may be alternatively generated.

This is to expect that the transmission timing of the mobile station 110 is restored back to that previously shifted, and during repeated retransmission, timing detection is successfully accomplished. For example, in the event that the mobile station 110 could not have received a timing correction burst from the base station 120 since the mobile station 110 has accidentally come into a so-called dead point, in which wireless communication cannot be established, the mobile station 110 can receive the timing correction burst if it comes out of the dead point.

In S412, a channel, in which transmission timing is advanced or delayed by a predetermined shift amount, may be generated. In other words, transmission timing may be continuously shifted in one direction by advancing or delaying the transmission timing. This is to expect that during repeated performance of such a process, timing detection is successfully accomplished.

The sum of the shift amounts of transmission timing, which is calculated and stored in S414, is shorter than the length (512 samples) of the effective symbol. If the sum of the shift amounts of transmission timing is longer than the length of the effective symbol, timing detection is failed.

In order to meet this requirement, an amount of one shift naturally has to be shorter than a length (512 samples) of an effective symbol. In this embodiment, as shown in FIG. 7, a shift amount is ¼ of the data (effective symbol) length. If two types of transmission timings are alternatively repeated and generated, a sum of shift amounts always satisfies the requirement. In addition, if transmission timing is continuously shifted in one direction, it is preferable to control the number of times of shifting to meet the requirement.

Specifically, a shift amount may be determined as set forth below. That is, a length obtained by subtracting a timing detection range Y from the data length (512 samples) of FIG. 5 is X (X=512−Y). A shorter one of X and Y is an amount of one shift. If X and Y are the same, any of them may be selected. Typically, selecting X=about 40 as an amount of one shift is preferable. In other words, the timing detection range Y=about 470 is preferable.

In FIG. 6, there is a case where even if the mobile station 110 transmits a communication channel assignment request to the base station 120 (S418), a communication channel is not assigned from the base station 120. As to the cause, it may be assumed that the base station 120 could not have received the communication channel assignment request since the mobile station 110 has come to the dead point, or communication power is low. When the base station 120 receives the communication channel assignment request in S420, the base station 120 necessarily assigns a communication channel to the mobile station 110 (S422). If not, however, the base station 120 does not perform communication channel assignment.

Figure 9:
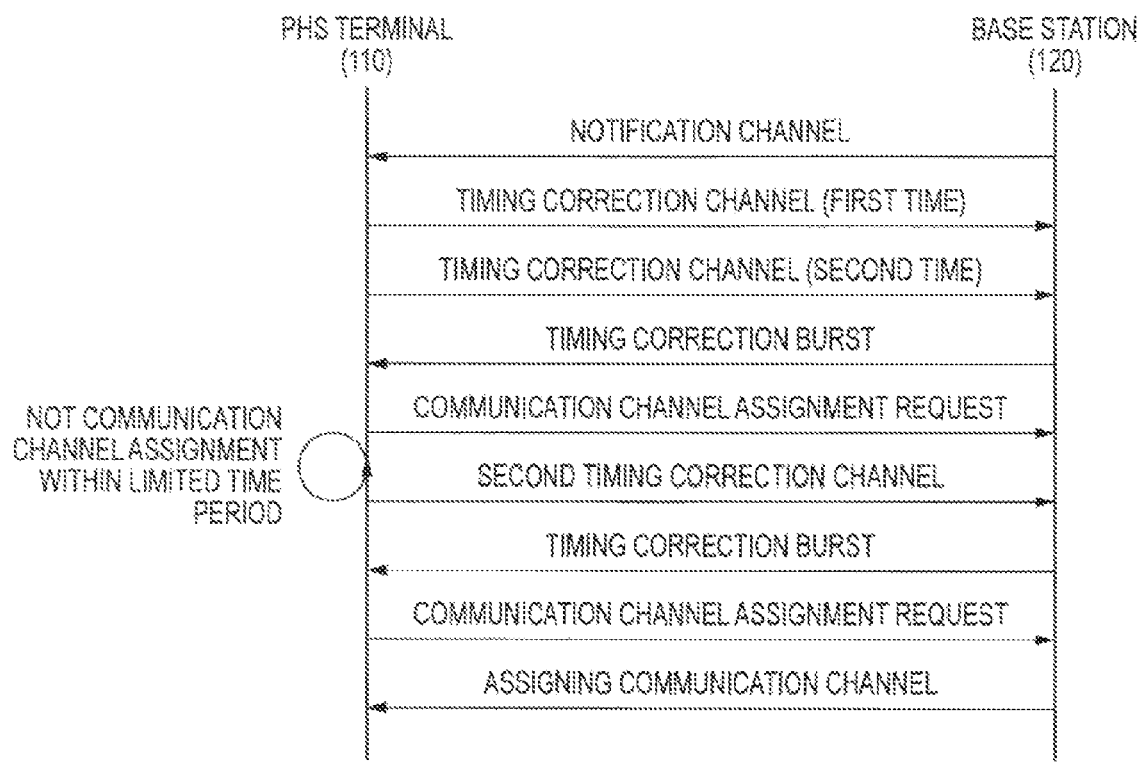
FIG. 9 A sequential view showing that assignment of a communication channel is successfully accomplished by regenerating a previously generated timing correction channel in the case where a communication channel is not assigned.

In that case, in this embodiment, as shown in FIG. 9, the mobile station 110 prepares a limited time period in advance, and if a communication channel is not assigned within the limited time period (S424), an OFDM symbol is transmitted to the base station 120 at the same timing as a previously generated channel (second channel) (S426) to implement processes (steps following S404) of the base station 120 again.

Since a timing correction burst is obtained once by a previously generated channel, if an OFDM signal is transmitted at the same timing as the channel, it is highly likely that a timing correction burst can be immediately obtained without performing the process of shifting transmission timing (FIG. 9).

While the preferable embodiment of the present invention has been described with reference to the accompanying drawings, it goes without saying that the present invention is not limited to the embodiment. It is apparent to one skilled in the art that various modifications and changes can be made within the scope set forth in the claims, and it should be understood that such modifications and changes fall under the technical scope of the present invention.

While the present invention has been described in detail with reference to a particular embodiment, it is apparent to one skilled in the art that various modifications and changes can be made without departing from the spirit and the scope of the present invention.

The present application is based on Japanese Patent Application No. 2008-081381 filed on Mar. 26, 2008, the disclosures of which are herein incorporated by reference.

INDUSTRIAL APPLICABILITY

The present invention relates to a wireless communication method, a wireless communication system, a base station and a mobile station, which conduct wireless communication using an OFDM modulation scheme.

The invention claimed is:

1. A wireless communication method of conducting wireless communication between a mobile station and a base station by using an OFDM modulation scheme, the method comprising:
notifying a notification channel from the base station to the mobile station;
in the mobile station,
generating a channel to be frame synchronized with the notification channel and transmitting an OFDM symbol to the base station;
in the base station, as peak detection processes thereof,
removing a guard interval from the transmitted OFDM symbol to obtain an effective symbol;
detecting a correlation peak between the effective symbol and a known ideal symbol; and
only when the correlation peak is detected in a predetermined timing detection range shorter than a length of the effective symbol, transmitting a differential between reference timing of the base station and the time of the detection of the correlation peak to the mobile station by means of a timing correction burst;
in the mobile station,
if the timing correction burst is not introduced from the base station even after expiration of predetermined time duration from the transmission of the OFDM symbol to the base station,
copying a signal by a length different from a guard interval from the end of an effective symbol and adding the copied signal to the front of the effective symbol to shift transmission timing of a previously generated channel by a predetermined shift amount so as to generate a new channel having the shifted transmission timing; and
transmitting an OFDM symbol to the base station to implement the peak detection processes of the base station again, and
if the timing correction burst is introduced from the base station within the predetermined time,
correcting transmission timing by calculating a sum of shift amounts of transmission timing to the present time in order to solve a differential from reference timing of the base station; and
transmitting a communication channel assignment request to the base station at the corrected transmission timing.

2. The wireless communication method according to claim 1,
wherein in the process of generating a new channel in the mobile station, any one of two types of channels, which are alternatively generated due to differentials by the predetermined shift amount in transmission timing, is generated.

3. The wireless communication method according to claim 1,
wherein in the process of generating a new channel in the mobile station, a channel, in which transmission timing is advanced or delayed by the predetermined shift amount, is generated by making a length of signal to be copied shorter or longer than a guard interval.

4. The wireless communication method according to claim 1,
wherein the sum of the shift amounts is shorter than the length of the effective symbol.

5. The wireless communication method according to claim 1,
wherein if a communication channel is not assigned from the base station despite that the mobile station transmits a communication channel assignment request to the base station, the mobile station transmits the OFDM symbol to the base station as the same timing as the previously generated channel to implement peak detection processes of the base station again.

6. A wireless communication system comprising a mobile station and a base station, which conduct wireless communication by using an OFDM modulation scheme,
wherein the base station comprises:
a notification unit that notifies the mobile station of a notification channel;
a guard interval removing unit that removes a guard interval from an OFDM symbol transmitted from the mobile station through a channel generated by the personal channel to obtain an effective symbol;
a timing detection unit that detects a correlation peak between the effective symbol and a known ideal symbol; and
a correlation peak determination unit that transmits a differential between reference timing of the base station and the time of the detection of the correlation peak to the mobile station by means of a timing correction burst only when the correlation peak is detected within a predetermined timing detection range shorter than a length of the effective symbol, and
wherein the mobile station comprises:
a timing correction channel generating unit, which generates a channel to be frame synchronized with the notification channel and transmits an OFDM symbol to the base station, and which, if the timing correction burst is not introduced from the base station even after expiration of predetermined time duration from the transmission, copies a signal by a length different from a guard interval from the end of an effective symbol and adds the copied signal to the front of the effective symbol to shift transmission timing of a previously generated channel by a predetermined shift amount so as to generate a new channel having the shifted transmission timing and transmit an OFDM symbol to the base station;
a shift storing unit that stores a sum of shift amounts of transmission timing in the timing correction channel generating unit;
a transmission timing correcting unit which, if the timing correction burst is introduced from the base station within the predetermined time, corrects transmission timing by calculating a sum of shift amounts of transmission timing stored in the shift storing unit in order to solve a differential from reference timing of the base station; and
a communication channel assignment request unit that transmits a communication channel assignment request to the base station at the corrected transmission timing.

7. A base station that conducts wireless communication with a mobile station by using an OFDM modulation scheme, wherein the mobile station comprises:
a timing correction channel generating unit, which generates a channel to be frame synchronized with a notification channel notified from the base station and transmits an OFDM symbol to the base station, and which, if a timing correction burst is not introduced from the base station even after expiration of predetermined time duration from the transmission, copies a signal by a length different from a guard interval from the end of an effective symbol and adds the copied signal to the front of the effective symbol to shift transmission timing of a previously generated channel by a predetermined shift amount so as to generate a new channel having the shifted transmission timing and transmit an OFDM symbol to the base station;
a shift storing unit that stores a sum of shift amounts of transmission timing in the timing correction channel generating unit;
a transmission timing correcting unit which, if the timing correction burst is introduced from the base station within the predetermined time, corrects transmission timing by calculating a sum of shift amounts of transmission timing stored in the shift storing unit to solve a differential from reference timing of the base station; and
a communication channel assignment request unit that transmits a communication channel assignment request to the base station at the corrected transmission timing, and
wherein the base station comprises:
a notification unit that notifies the mobile station of a notification channel;
a guard interval removing unit that removes a guard interval from an OFDM symbol transmitted from the mobile station through a channel generated by the personal channel to obtain an effective symbol;
a timing detection unit that detects a correlation peak between the effective symbol and a known ideal symbol; and
a correlation peak determination unit that transmits a differential between reference timing of the base station and the time of the detection of the correlation peak to the mobile station by means of a timing correction burst only when the correlation peak is detected within a predetermined timing detection range shorter than a length of the effective symbol.

8. A mobile station that conducts wireless communication with a base station by using an OFDM modulation scheme, the mobile station comprising:
a timing correction channel generating unit, which generates a channel to be frame synchronized with a notification channel notified from the base station and transmits an OFDM symbol to the base station, and which, if a timing correction burst is not introduced from the base station even after expiration of predetermined time duration from the transmission, copies a signal by a length different from a guard interval from the end of an effective symbol and adds the copied signal to the front of the effective symbol to shift transmission timing of a previously generated channel by a predetermined shift amount so as to generate a new channel having the shifted transmission timing and transmit an OFDM symbol to the base station;
a shift storing unit that stores a sum of shift amounts of transmission timing in the timing correction channel generating unit;
a transmission timing correcting unit which, if the timing correction burst is introduced from the base station within the predetermined time, corrects transmission timing by calculating a sum of shift amounts of transmission timing stored in the shift storing unit in order to solve a differential from reference timing of the base station; and
a communication channel assignment request unit that transmits a communication channel assignment request to the base station at the corrected transmission timing.

* * * * *